United States Patent
Komninakis et al.

(10) Patent No.: US 12,375,204 B2
(45) Date of Patent: Jul. 29, 2025

(54) WEIGHTED ERROR OPTIMIZATION FOR DIGITAL PRE-DISTORTION

(71) Applicant: QUALCOMM Incorporated, San Diego, CA (US)

(72) Inventors: Christos Komninakis, Solana Beach, CA (US); Sanjay Avasarala, San Diego, CA (US); Ryan Scott Castro Spring, San Diego, CA (US); Aidin Bassam, San Diego, CA (US); Michael Lee McCloud, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 17/657,699

(22) Filed: Apr. 1, 2022

(65) Prior Publication Data
US 2023/0318737 A1 Oct. 5, 2023

(51) Int. Cl.
*H04L 27/38* (2006.01)
*H04B 1/04* (2006.01)
*H04L 1/00* (2006.01)
*H04L 5/00* (2006.01)

(52) U.S. Cl.
CPC ......... *H04L 1/0015* (2013.01); *H04B 1/0475* (2013.01); *H04L 5/0048* (2013.01)

(58) Field of Classification Search
CPC ... H04L 5/0048; H04L 1/0015; H04L 27/367; H04L 25/0224; H04L 25/0204; H04L 25/0242; H04B 1/0475
See application file for complete search history.

(56) References Cited

U.S. PATENT DOCUMENTS

| 9,906,428 | B2 | 2/2018 | Kim et al. | |
|---|---|---|---|---|
| 2012/0015603 | A1* | 1/2012 | Proctor, Jr. | H01Q 21/28 455/11.1 |
| 2017/0041164 | A1* | 2/2017 | Liu | H04L 27/265 |
| 2018/0183472 | A1* | 6/2018 | Wen | H04B 7/0417 |
| 2019/0369657 | A1* | 12/2019 | Womac | H03L 7/0891 |
| 2021/0327439 | A1* | 10/2021 | Wang | G10L 19/06 |
| 2023/0015640 | A1* | 1/2023 | Cao | H03F 3/189 |

OTHER PUBLICATIONS

International Search Report and Written Opinion—PCT/US2023/015673—ISA/EPO—Jul. 13, 2023.

\* cited by examiner

*Primary Examiner* — Anez C Ebrahim
(74) *Attorney, Agent, or Firm* — QUALCOMM Incorporated

(57) ABSTRACT

Various aspects of the present disclosure generally relate to wireless communication. In some aspects, a wireless node may receive a configuration indicating a parameter of a signal to be optimized for a portion of a frequency range. The wireless node may transform a feedback signal and a reference signal into a frequency domain. The wireless node may generate an error signal based at least in part on transforming the feedback signal and the reference signal. The wireless node may assign weights to the error signal to generate a weighted error signal. The weights may be assigned to the error signal in the portion of the frequency range and a remaining portion of the frequency range according to the configuration. The wireless node may transmit the signal based at least in part on utilizing the weighted error signal to apply digital pre-distortion to the signal. Numerous other aspects are described.

28 Claims, 5 Drawing Sheets

WEIGHTED ERROR OPTIMIZATION FOR DIGITAL PRE-DISTORTION

FIELD OF THE DISCLOSURE

Aspects of the present disclosure generally relate to wireless communication and to techniques and apparatuses for weighted error optimization for digital pre-distortion (DPD).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless node. The method may include receiving a configuration indicating one or more parameters of a signal to be optimized for a portion of a frequency range over which the signal is transmitted. The method may include transforming a feedback signal and a reference signal from a time domain into a frequency domain. The method may include generating an error signal based at least in part on the feedback signal and the reference signal being transformed into the frequency domain. The method may include assigning weights to the error signal to generate a weighted error signal, wherein the weights are assigned to the error signal in the portion of the frequency range and a remaining portion of the frequency range according to the configuration. The method may include transmitting the signal based at least in part on applying on digital pre-distortion (DPD) to the signal, wherein the DPD is computed based at least in part on the weighted error signal.

Some aspects described herein relate to a wireless node for wireless communication. The wireless node may include a memory and one or more processors coupled to the memory. The one or more processors may be configured to receive a configuration indicating one or more parameters of a signal to be optimized for a portion of a frequency range over which the signal is transmitted. The one or more processors may be configured to transform a feedback signal and a reference signal from a time domain into a frequency domain. The one or more processors may be configured to generate an error signal based at least in part on the feedback signal and the reference signal being transformed into the frequency domain. The one or more processors may be configured to assign weights to the error signal to generate a weighted error signal, wherein the weights are assigned to the error signal in the portion of the frequency range and a remaining portion of the frequency range according to the configuration. The one or more processors may be configured to transmit the signal based at least in part on applying DPD to the signal, wherein the DPD is computed based at least in part on the weighted error signal.

Some aspects described herein relate to a non-transitory computer-readable medium that stores a set of instructions for wireless communication by a wireless node. The set of instructions, when executed by one or more processors of the wireless node, may cause the wireless node to receive a configuration indicating one or more parameters of a signal to be optimized for a portion of a frequency range over which the signal is transmitted. The set of instructions, when executed by one or more processors of the wireless node, may cause the wireless node to transform a feedback signal and a reference signal from a time domain into a frequency domain. The set of instructions, when executed by one or more processors of the wireless node, may cause the wireless node to generate an error signal based at least in part on the feedback signal and the reference signal being transformed into the frequency domain. The set of instructions, when executed by one or more processors of the wireless node, may cause the wireless node to assign weights to the error signal to generate a weighted error signal, wherein the weights are assigned to the error signal in the portion of the frequency range and a remaining portion of the frequency range according to the configuration. The set of instructions, when executed by one or more processors of the wireless node, may cause the wireless node to transmit the signal based at least in part on applying DPD to the signal, wherein the DPD is computed based at least in part on the weighted error signal.

Some aspects described herein relate to an apparatus for wireless communication. The apparatus may include means for receiving a configuration indicating one or more parameters of a signal to be optimized for a portion of a frequency range over which the signal is transmitted. The apparatus may include means for transforming a feedback signal and a reference signal from a time domain into a frequency domain. The apparatus may include means for generating an error signal based at least in part on the feedback signal and the reference signal being transformed into the frequency domain. The apparatus may include means for assigning weights to the error signal to generate a weighted error signal, wherein the weights are assigned to the error signal in the portion of the frequency range and a remaining portion of the frequency range according to the configuration. The apparatus may include means for transmitting the signal based at least in part on applying DPD to the signal, wherein the DPD is computed based at least in part on the weighted error signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
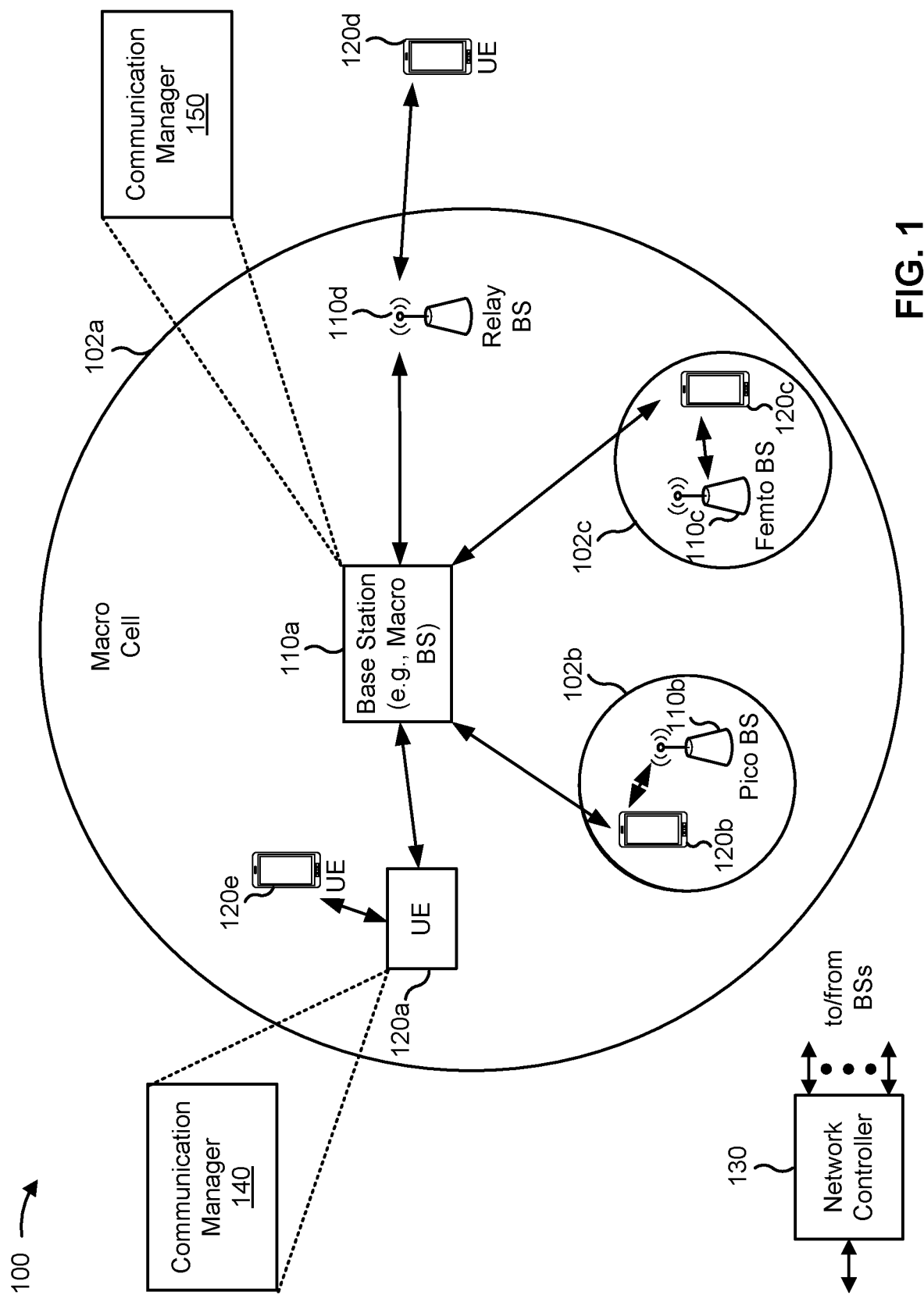
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with weighted error optimization for digital predistortion (DPD). For example, the communication manager 140 may receive a configuration indicating one or more parameters of a signal to be optimized for a portion of a frequency range over which the signal is transmitted; transform a feedback signal and a reference signal from a time domain into a frequency domain; generate an error signal based at least in part on the feedback signal and the reference signal being transformed into the frequency domain; assign weights to the error signal to generate a weighted error signal, wherein the weights are assigned to the error signal in the portion of the frequency range and a remaining portion of the frequency range according to the configuration; and transmit the signal based at least in part on applying on DPD to the signal, wherein the DPD is computed based at least in part on the weighted error signal. Additionally, or alternatively, the communication manager 140 may perform one or more other operations described herein.

In some aspects, the base station 110 may include a communication manager 150. As described in more detail elsewhere herein, the communication manager 150 may perform one or more operations associated with weighted error optimization for DPD. For example, the communication manager 150 may receive a configuration indicating one or more parameters of a signal to be optimized for a portion of a frequency range over which the signal is transmitted; transform a feedback signal and a reference signal from a time domain into a frequency domain; generate an error signal based at least in part on the feedback signal and the reference signal being transformed into the frequency domain; assign weights to the error signal to generate a weighted error signal, wherein the weights are assigned to the error signal in the portion of the frequency range and a remaining portion of the frequency range according to the configuration; and transmit the signal based at least in part on applying on DPD to the signal, wherein the DPD is computed based at least in part on the weighted error signal. Additionally, or alternatively, the communication manager 150 may perform one or more other operations described herein.

As used herein, the term "wireless node" may refer to any UE, base station, apparatus, device, or computing system configured to perform any techniques described herein. For example, a wireless node may be a UE. As another example, a wireless node may be a base station. As another example, a first wireless node may be configured to communicate with a second wireless node or a third wireless node. In one aspect of this example, the first wireless node may be a UE and the second wireless node may be a base station. Similarly, a third wireless node may be a UE, a base station, or another device. In some aspects of this example, first, second, and third wireless nodes may be the same type of device or different types of devices. Similarly, reference to a UE, base station, apparatus, device, or computing system may include disclosure of the UE, base station, apparatus, device, or computing system being a wireless node. For example, disclosure that a UE is configured to receive information from a base station also discloses that a first wireless node is configured to receive information from a second wireless node. In this example, consistent with this disclosure, "first wireless node" may refer to a first UE, a first base station, a first apparatus, a first device, or a first computing system configured to receive the information; and "second wireless node" may refer to a second UE, a second base station, a second apparatus, a second device, or a second computing system.

As indicated above, FIG. 1 is provided as an example. Other examples may differ from what is described with regard to FIG. 1.

Figure 2:
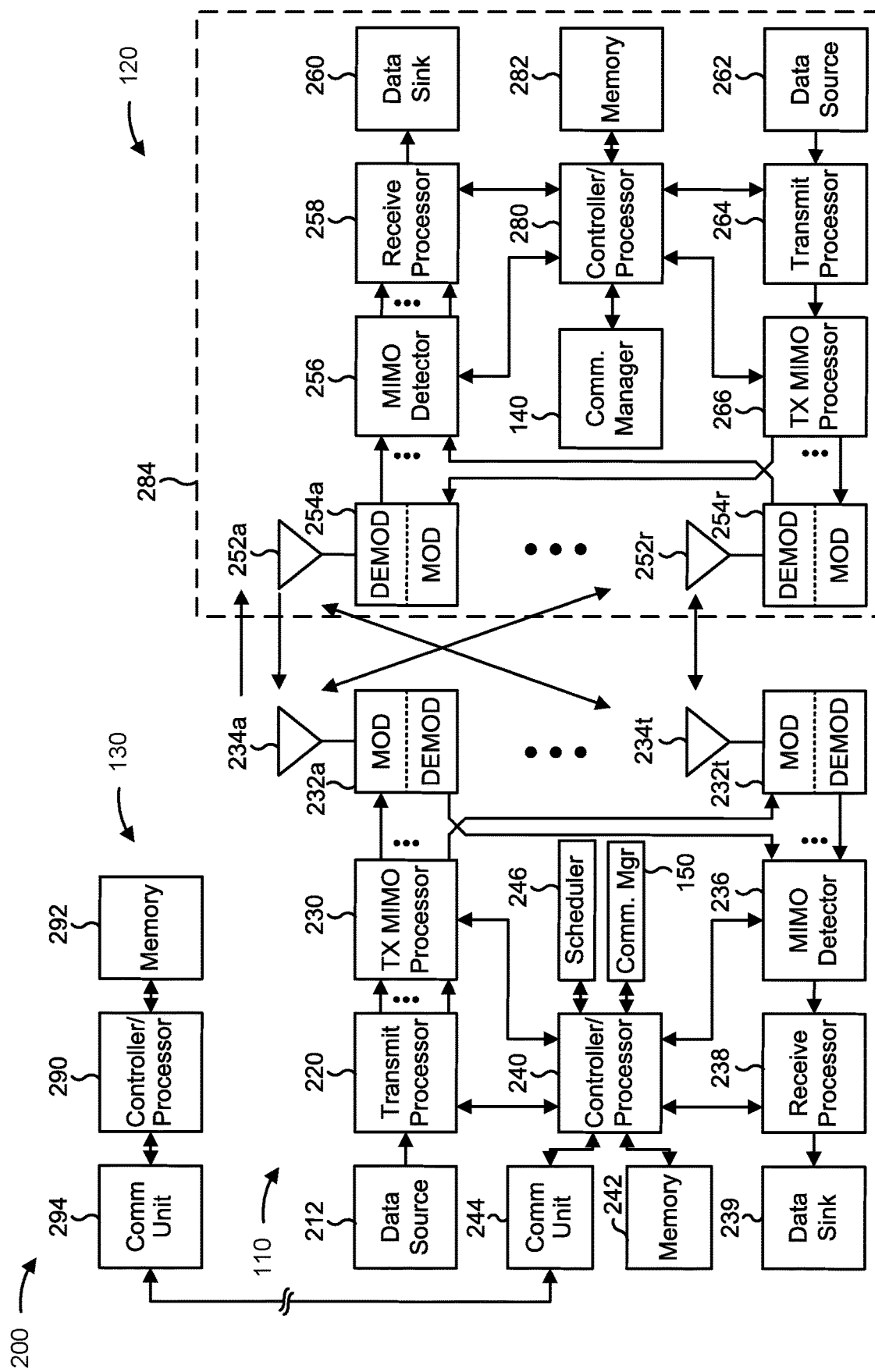
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

As described herein, the term "base station" (e.g., the base station 110) may refer to an aggregated base station, a disaggregated base station, and/or one or more components of a disaggregated base station. For example, in some aspects, "base station" may refer to a control unit (CU), a distributed unit (DU), a radio unit (which may additionally, or alternatively, be referred to as a relay unit or a repeater unit) (RU), multiple CUs, multiple DUs, multiple RUs, and/or any suitable combination thereof. In some aspects, "base station" may refer to one device configured to perform one or more functions described herein in connection with the base station 110. In some aspects, "base station" may refer to multiple devices configured to perform one or more functions described herein in connection with the base station 110. For example, in some distributed systems, each of several different devices (which may be located in the same geographic location or in different geographic locations) may be configured to perform at least a portion of a function of the base station 110, or to duplicate performance of at least a portion of a function the base station 110, and the term "base station" may refer to any one or more of such devices. In some aspects, "base station" may refer to one or more virtual base stations, one or more virtual base station functions, and/or a combination of thereof. For example, in some cases, two or more base station functions may be instantiated on a single device. In some aspects, "base station" may refer to one of the base station functions and not another. In this way, a single device may include more than one base station and/or a single base station may include more than one device.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-5).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-5).

The controller/processor 240 of the base station 110, the controller/processor 280 of the UE 120, and/or any other component(s) of FIG. 2 may perform one or more techniques associated with performing weighted error optimization for DPD, as described in more detail elsewhere herein. In some aspects, the wireless node described herein is the base station 110, is included in the base station 110, or includes one or more components of the base station 110 shown in FIG. 2. In some aspects, the wireless node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 400 of FIG. 4, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, and/or other processes as described herein. In some examples, executing instructions may include running the instructions, converting the instructions, compiling the instructions, and/or interpreting the instructions, among other examples.

In some aspects, the wireless node includes means for receiving a configuration indicating one or more parameters of a signal to be optimized for a portion of a frequency range over which the signal is transmitted; means for transforming a feedback signal and a reference signal from a time domain into a frequency domain; means for generating an error signal based at least in part on the feedback signal and the reference signal being transformed into the frequency domain; means for assigning weights to the error signal to generate a weighted error signal, wherein the weights are assigned to the error signal in the portion of the frequency range and a remaining portion of the frequency range according to the configuration; and/or means for transmitting the signal based at least in part on applying DPD to the signal, wherein the DPD is computed based at least in part on the weighted error signal. In some aspects, the means for the wireless node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In some cases, a wireless node (e.g., a UE, a base station, a TRP, a central unit, or a distributed unit, among other examples) may include a component that, as power increases, causes signals to be transmitted with increasing non-linearity. For example, a wireless node may include a power amplifier (PA) that distorts a transmitted signal as a result of a relatively higher peak-to-average-power ratio. The non-linear distortion may be an in-band distortion, which affects link performance in connection with an error vector magnitude (EVM) amount, or an out-of-band distortion, which causes adjacent channel interference.

Commonly, the wireless node may perform DPD to address the distortion of the transmitted signal. DPD is a technique used to reverse the impact of the non-linearity caused by a component (e.g., a PA) at the transmitter side. In general, DPD may apply inverse distortion (e.g., using a pre-distorter) at an input signal of the PA to cancel the distortion generated by the component.

In some cases, DPD may be designed based at least in part on utilizing an output of the component causing the non-linearities and a reference signal to determine an error signal corresponding to the non-linearities in the signal. An inverse of the error signal is computed and is applied to the input of the PA to compensate for the non-linearities. Commonly, the output of the component and the reference signal are considered in the time domain. Thus, all frequency components of the error signal are equally emphasized. However, in some cases DPD performance may need to be optimized more heavily in one frequency range relative to other frequency ranges.

Some techniques and apparatuses described herein enable a DPD component of a wireless node to optimize one or more transmission parameters of a signal for a particular frequency range while maintaining a level of performance for transmission parameters in other frequency ranges. In some aspects, the DPD component may generate an error signal based at least in part on an output of a component causing non-linearities in a signal to be transmission (e.g., a PA) and a reference signal. The DPD component may transform the error signal from a time-domain to a frequency domain. The DPD component may apply weights to one or more frequency components of the error signal to optimize one or more transmission parameters for a particular frequency range relative to transmission parameters for other frequency ranges. The DPD component may transform the weighted error signal from the frequency domain to the time domain and may apply the inverse of the weighted, transformed error signal to an input of the component causing the non-linearities. In this way, the DPD component may optimize parameters for particular frequency ranges rather than all frequency components of the error signal being equally emphasized.

Figure 3:
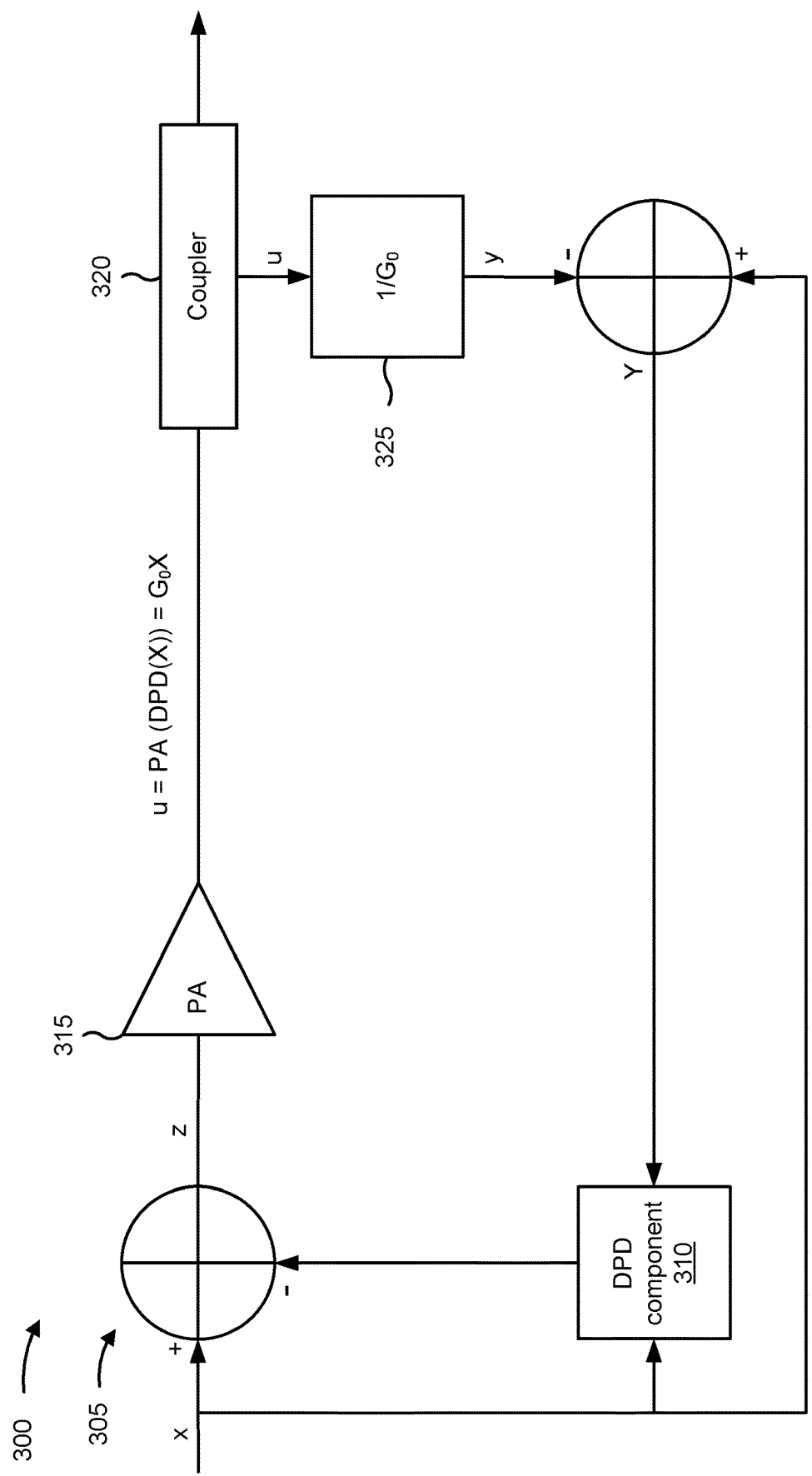
FIG. 3 is a diagram illustrating an example associated with weighted error optimization for digital pre-distortion (DPD), in accordance with the present disclosure.

FIG. 3 is a diagram illustrating an example 300 associated with weighted error optimization for DPD, in accordance with the present disclosure. As shown in FIG. 3, example 300 includes a wireless node 305 configured to perform weighted error optimization DPD. As shown in FIG. 3, the wireless node 305 may include a DPD component 310, a component 315 causing non-linearities in a signal, a coupler 320, and an inverse gain component 325. The wireless node 305 may include a device configured to transmit a wireless signal. For example, the wireless node 305 may include a UE (e.g., UE 120), a base station (e.g., base station 110), a CU, a DU, or a TRP, among other examples. Although the component 315 is shown in FIG. 3 as a particular component (e.g., a PA), the component 315 may include any type of component causing non-linearities in a signal to be transmitted by the wireless node 305.

In some aspects, the DPD component 310 may be configured to apply DPD to an input signal of the component 315 based at least in part on a memoryless model, a memory polynomial, a direct learning architecture, an indirect learning architecture, an adaptive calibration process, or a static calibration process, among other examples. In some aspects, the DPD component 310 may perform error optimization for DPD based at least in part on a feedback signal (e.g., an output) from the component 315. The inverse gain component 325 may receive the feedback signal from the component 315 via the coupler 320 and may normalize the feedback signal based at least in part on a property of the component 315. For example, as shown in FIG. 3, the component 315 may include a PA and the inverse gain component 325 may normalize the feedback signal based at least in part on a gain associated with the PA. For example, the inverse gain component 325 may divide the feedback signal by a gain (Go) of the component 315 to generate a reduced feedback signal (e.g., y=u/Go).

In some aspects, the DPD component 310 may generate a residual error signal (Y) based at least in part on the reduced feedback signal and a reference signal (x). In some aspects, the reference signal may correspond to an input of the component 315. For example, the DPD component 310 may generate the residual error signal based at least in part on subtracting the feedback signal from the reference signal or subtracting the reference signal from the feedback signal, among other examples. In some aspects, the residual error signal, the feedback signal, the reduced feedback signal, and/or the reference signal may be represented in the time domain.

In some aspects, DPD component 310 may receive the residual error signal and may transform the residual error signal from a representation in the time domain to a representation in the frequency domain. For example, the DPD component 310 may include a fast Fourier transform (FFT) component that transforms the residual error signal to a representation in the frequency domain based at least in part on computing a discrete Fourier transform (DFT) of a sequence of values corresponding to the representation of the residual error signal in the time domain. The DPD component 310 may compute the DFT based at least in part on decomposing the sequence of values into components (e.g., Kernels) of different frequencies.

As an example, the signal vectors x, z, and y, shown in FIG. 3, may include N samples (x, z, y∈$C^{N \times 1}$) after time alignment. The DPD component 310 may perform DPD by modifying the input waveform (x) by applying a vector of weights w∈$C^{C \times 1}$ to the C Kernels formed by the input signal (e.g., $k_1(x)$, $k_2(x)$, ... $k_C(x)$). For example, for an input signal x[t], t=0, 1, ..., N−1, a Kernel used in DPD may be $$k_i(x[t]) = x^3[t]|x[t-1]|^2$$

In some aspects, the DPD component 310 includes an indirect learning architecture that utilizes a training procedure to model the component 315. In some aspects, the training procedure may include obtaining vectors of samples of the waveforms z and y. The DPD component 310 may construct the Kernels from the normalized feedback signal y and solving an N×C least square fit problem. The N×C matrix may be generated based at least in part on the normalized feedback signal y (e.g., K(y)=[$k_1(y)$, $k_2(y)$, ... $k_C(y)$]).

The optimum DPD Kernel weights w may be determined based at least in part on solving the N×C least square problem:

$$\min_w \|z - K(y) \cdot w\|^2 \quad (1).$$

To emphasize certain frequency ranges, FFT-matrices may be utilized to transform the N×C least square problem into the frequency domain.

For a set of L frequencies, the DPD component 310 may generate an L×N FFT matrix F∈$C^{L \times N}$. The DPD component 310 may transform the vector and matrix in equation 1 as an N×C least square fit problem:

$$\min_w \|Z - A \cdot w\|^2 \quad (2)$$

where Z=F·z, with Z∈$C^{L \times 1}$, and A=F·K(y), with A∈$C^{L \times C}$.

The DPD component 310 may utilize a diagonal weight matrix D, with D∈$R^{L \times 1}$, In some aspects, the DPD component 310 may utilize the diagonal weight matrix to generate a weighted least square fit problem having the solution:

$$w = (A^*DA)^{-1}A^*DZ \quad (3)$$

where w is the optimum DPD kernel weights in the frequency domain.

In this case, the weighted least squares problem may correspond to equation 1 with z and K(y) replaced by circularly convoluted versions of themselves. Although the computations are described with respect to an indirect learning architecture, the frequency-domain weighted-error methodology described herein may be utilized in a direct-learning architecture. For example, the DPD component 310 may determine kernel weights in a Volterra series that models the non-linearity of the component 315. In some aspects, the DPD component 310 may determine optimum DPD kernel weights in the frequency domain in a manner similar to that described above.

In some aspects, the diagonal weight matrix may be generated to emphasize one or more frequencies to achieve higher DPD performance relative to other frequencies. In some aspects, the DPD component 310 may generate the diagonal weight matrix based at least in part on a configuration. For example, the wireless node may include a UE and the UE may receive a configuration from a base station to which the UE is connected. The configuration may indicate multiple portions of the error signal that are associated with different frequency ranges and may indicate different weights to be assigned to each portion of the error signal to emphasize one or more frequency ranges to achieve higher DPD performance relative to other frequency ranges. Alternatively, and/or additionally, the wireless node may be pre-configured with the configuration. For example, the configuration may be stored in a memory of the wireless node.

In some aspects, the diagonal weight matrix may be generated to achieve higher quality DPD performance for ACLR relative to EVM when emphasizing out-of-band frequencies. For example, the configuration may indicate that an ACLR parameter is to be optimized over an EVM parameter and the diagonal weight matrix may be generated to assign a first weight to an out-of-channel portion of the error signal and a second, lower weight to an in-channel portion of the error signal.

In some aspects, the diagonal weight matrix may be generated to achieve higher quality DPD performance for EVM relative to ACLR when emphasizing in-band frequencies. For example, the configuration may indicate that an EVM parameter is to be optimized over an ACLR parameter and the diagonal weight matrix may be generated to assign a first weight to an in-channel portion of the error signal and a second, lower weight to an out-of-channel portion of the error signal.

In some aspects, the diagonal weight matrix may be generated to optimize an ACLR parameter associated with a side-band. For example, the configuration may indicate that an ACLR parameter associated with a side-band is to be optimized and the diagonal weight matrix may be generated to assign a first weight to a portion the error signal associated with the side-band and a second, lower weight to a remaining portion of the error signal.

In some aspects, the DPD component 310 may modify one or more portions of the configuration based at least in part on an in-band frequency associated with the wireless node 305. For example, the configuration may indicate an in-band frequency range associated with the configuration and a weight coefficient for a portion of a frequency range to be optimized by the DPD component 310. In some aspects, the DPD component 310 may determine that the in-band frequency associated with the configuration is different from the in-band frequency of the wireless node 305. The DPD component 310 may modify the weight coefficient for the portion of the frequency range based at least in part on the difference between the in-band frequency associated with the configuration and the in-band frequency of the wireless node 305.

For example, the configuration may be associated with an in-band frequency of 840 MHz and may indicate a weight coefficient for a frequency range of 850 MHz through 853 MHZ. The in-band frequency of the wireless node 305 may be 830 MHz. The DPD component 310 may reduce the weight coefficient for the frequency range based at least in part on a range of frequencies between the in-band frequency associated with the configuration and the frequency range being less than the range of frequencies between the in-band frequency of the wireless node 305 and the frequency range.

The DPD component 310 may apply DPD to the input signal of the component 315 based at least in part on the optimum DPD weights. The wireless node may transmit the signal based at least in part on the DPD being applied to the input signal of the component 315.

As indicated above, FIG. 3 is provided as an example. Other examples may differ from what is described with respect to FIG. 3.

Figure 4:
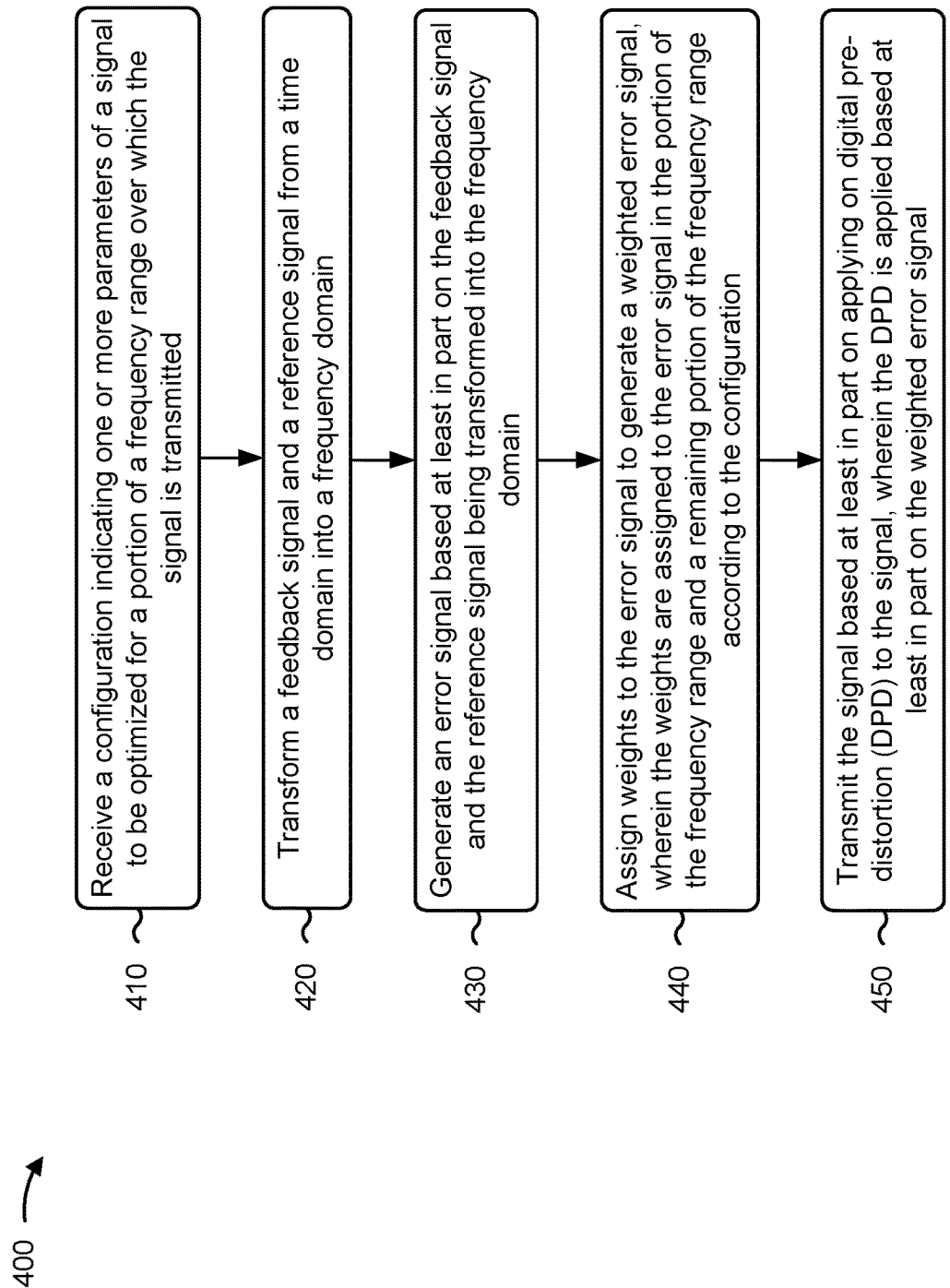
FIG. 4 is a diagram illustrating an example process associated with weighted error optimization for DPD, in accordance with the present disclosure.

FIG. 4 is a diagram illustrating an example process 400 performed, for example, by a wireless node, in accordance with the present disclosure. Example process 400 is an example where the wireless node (e.g., wireless node 305) performs operations associated with weighted error optimization for DPD.

As shown in FIG. 4, in some aspects, process 400 may include receiving a configuration indicating one or more parameters of a signal to be optimized for a portion of a frequency range over which the signal is transmitted (block 410). For example, the wireless node (e.g., using communication manager 508 and/or reception component 502, depicted in FIG. 5) may receive a configuration indicating one or more parameters of a signal to be optimized for a portion of a frequency range over which the signal is transmitted, as described above.

As further shown in FIG. 4, in some aspects, process 400 may include transforming a feedback signal and a reference signal from a time domain into a frequency domain (block 420). For example, the wireless node (e.g., using communication manager 508 and/or transformation component 510, depicted in FIG. 5) may transform a feedback signal and a reference signal from a time domain into a frequency domain, as described above.

As further shown in FIG. 4, in some aspects, process 400 may include generating an error signal based at least in part on the feedback signal and the reference signal being transformed into the frequency domain (block 430). For example, the wireless node (e.g., using communication manager 508 and/or generation component 512, depicted in FIG. 5) may generate an error signal based at least in part on the feedback signal and the reference signal being transformed into the frequency domain, as described above.

As further shown in FIG. 4, in some aspects, process 400 may include assigning weights to the error signal to generate a weighted error signal, wherein the weights are assigned to the error signal in the portion of the frequency range and a remaining portion of the frequency range according to the configuration (block 440). For example, the wireless node (e.g., using communication manager 508 and/or weight component 514, depicted in FIG. 5) may assign weights to the error signal to generate a weighted error signal, wherein the weights are assigned to the error signal in the portion of the frequency range and a remaining portion of the frequency range according to the configuration, as described above.

As further shown in FIG. 4, in some aspects, process 400 may include transmitting the signal based at least in part on applying on DPD to the signal, wherein the DPD is computed based at least in part on the weighted error signal (block 450). For example, the wireless node (e.g., using communication manager 508 and/or transmission component 504, depicted in FIG. 5) may transmit the signal based at least in part on applying on DPD to the signal, wherein the DPD is computed based at least in part on the weighted error signal, as described above.

Process 400 may include additional aspects, such as any single aspect or any combination of aspects described below and/or in connection with one or more other processes described elsewhere herein.

In a first aspect, the configuration indicates that an adjacent channel leakage ratio parameter is optimized over an error vector magnitude parameter, and assigning the weights to the error signal to generate the weighted error signal comprises assigning a first weight to an out-of-channel portion of the error signal and a second weight to an in-channel portion of the error signal, wherein the first weight is a higher weight relative to the second weight.

In a second aspect, alone or in combination with the first aspect, the configuration indicates that an error vector magnitude parameter is optimized over an adjacent channel leakage ratio parameter, and assigning the weights to the error signal to generate the weighted error signal comprises assigning a first weight to an in-channel portion of the error signal and a second weight to an out-of-channel portion of the error signal, wherein the first weight is a higher weight relative to the second weight.

In a third aspect, alone or in combination with one or more of the first and second aspects, the configuration indicates that an adjacent channel leakage ratio parameter associated with a side-band is optimized, and assigning the weights to the error signal to generate the weighted error signal comprises assigning a first weight to a portion of the error signal associated with the side-band and a second weight to a remaining portion of the error signal, wherein the first weight is a higher weight relative to the second weight.

In a fourth aspect, alone or in combination with one or more of the first through third aspects, the DPD is computed based at least in part on a memoryless model, a memory polynomial, a direct learning architecture, an indirect learning architecture, an adaptive calibration process, or a static calibration process.

In a fifth aspect, alone or in combination with one or more of the first through fourth aspects, the configuration indicates an in-band frequency range and a weight coefficient for the portion of the frequency range, and assigning the weights to the error signal to generate the weighted error signal comprises applying the weight coefficient to the portion of the error signal associated with the portion of the frequency based at least in part on an in-band frequency associated with the wireless node corresponding to the in-band frequency indicated in the configuration.

In a sixth aspect, alone or in combination with one or more of the first through fifth aspects, the wireless node comprises a user equipment, a base station, a central unit, a distributed unit, or a transmit receive point.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
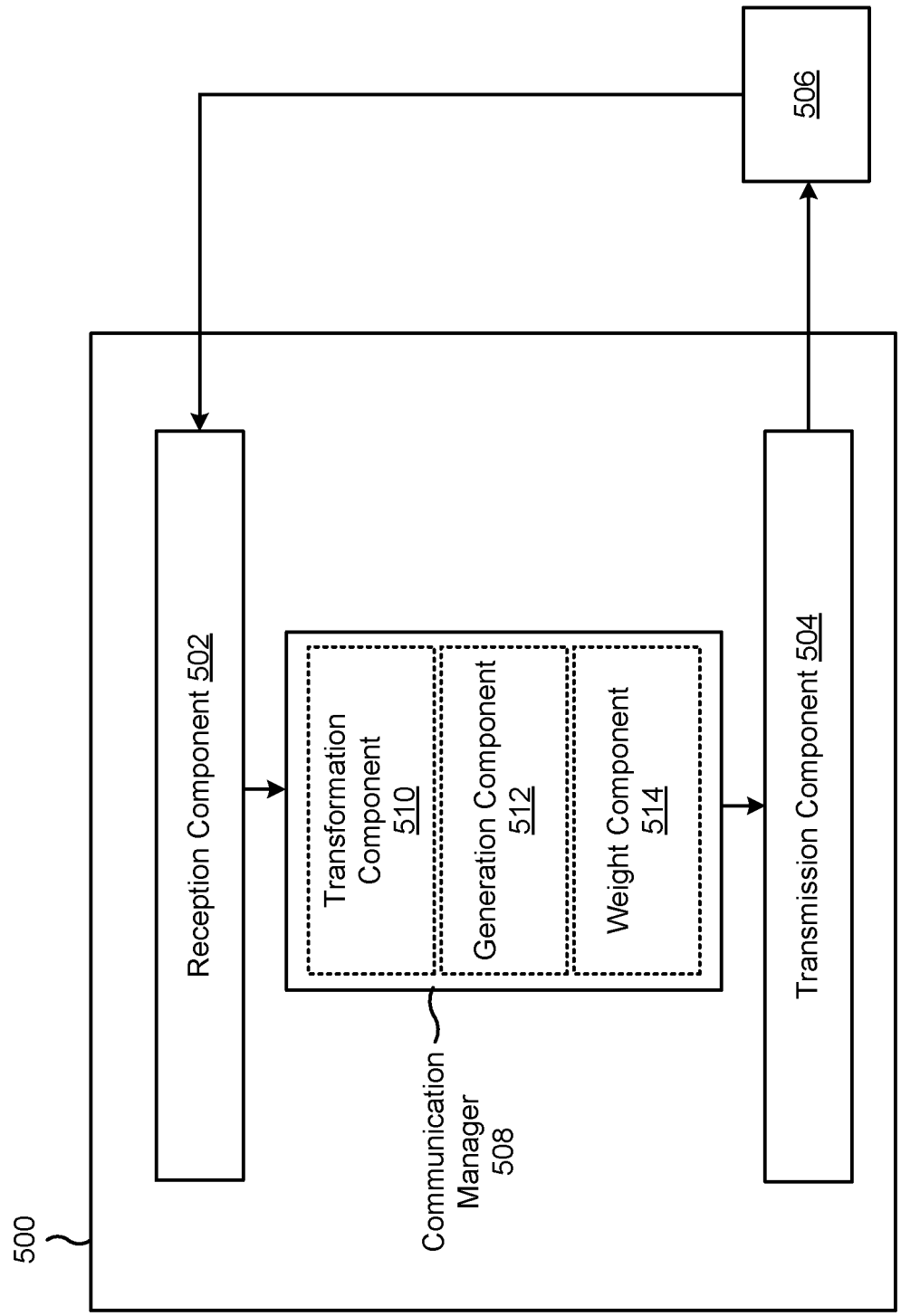
FIG. 5 is a diagram of an example apparatus for wireless communication, in accordance with the present disclosure.

FIG. 5 is a diagram of an example apparatus 500 for wireless communication. The apparatus 500 may be a wireless node, or a wireless node may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include the communication manager 508.

The communication manager 508 may control and/or otherwise manage one or more operations of the reception component 502 and/or the transmission component 804. In some aspects, the communication manager 508 may include one or more antennas, a modem, a controller/processor, a memory, or a combination thereof, of the UE and/or the base station described in connection with FIG. 2. The communication manager 508 may be, or be similar to, the communication manager 140 and/or the communication manager 150 depicted in FIGS. 1 and 2. For example, in some aspects, the communication manager 508 may be configured to perform one or more of the functions described as being performed by the communication manager 140 and/or the communication manger 150. In some aspects, the communication manager 508 may include the reception component 502 and/or the transmission component 504. The communication manager 508 may include one or more of a transformation component 510, a generation component 512, or a weight component 514, among other examples.

In some aspects, the apparatus 500 may be configured to perform one or more operations described herein in connection with FIG. 3. Additionally, or alternatively, the apparatus 500 may be configured to perform one or more processes described herein, such as process 400 of FIG. 4. In some aspects, the apparatus 500 and/or one or more components shown in FIG. 5 may include one or more components of the wireless node described in connection with FIG. 2. Additionally, or alternatively, one or more components shown in FIG. 5 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 500. In some aspects, the reception component 502 may include one or more antennas, a modem, a demodulator, a MIMO detector, a receive processor, a controller/processor, a memory, or a combination thereof, of the wireless node described in connection with FIG. 2.

The transmission component 504 may transmit communications, such as reference signals, control information, data communications, or a combination thereof, to the apparatus 506. In some aspects, one or more other components of the apparatus 500 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modem, a modulator, a transmit MIMO processor, a transmit processor, a controller/processor, a memory, or a combination thereof, of the wireless node described in connection with FIG. 2. In some aspects, the transmission component 504 may be co-located with the reception component 502 in a transceiver.

The reception component 502 may receive a configuration indicating one or more parameters of a signal to be optimized for a portion of a frequency range over which the signal is transmitted. The transformation component 510 may transform a feedback signal and a reference signal from a time domain into a frequency domain. The generation component 512 may generate an error signal based at least in part on the feedback signal and the reference signal being transformed into the frequency domain. The weight component 514 may assign weights to the error signal to generate a weighted error signal, wherein the weights are assigned to the error signal in the portion of the frequency range and a remaining portion of the frequency range according to the configuration. The transmission component 504 may transmit the signal based at least in part on applying on DPD to the signal, wherein the DPD is computed based at least in part on the weighted error signal.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a wireless node, comprising: receiving a configuration indicating one or more parameters of a signal to be optimized for a portion of a frequency range over which the signal is transmitted; transforming a feedback signal and a reference signal from a time domain into a frequency domain; generating an error signal based at least in part on the feedback signal and the reference signal being transformed into the frequency domain; assigning weights to the error signal to generate a weighted error signal, wherein the weights are assigned to the error signal in the portion of the frequency range and a remaining portion of the frequency range according to the configuration; and transmitting the signal based at least in part on applying on DPD to the signal, wherein the DPD is computed based at least in part on the weighted error signal.

Aspect 2: The method of Aspect 1, wherein the configuration indicates that an adjacent channel leakage ratio parameter is optimized over an error vector magnitude parameter, and wherein assigning the weights to the error signal to generate the weighted error signal comprises: assigning a first weight to an out-of-channel portion of the error signal and a second weight to an in-channel portion of the error signal, wherein the first weight is a higher weight relative to the second weight.

Aspect 3: The method of one or more of Aspects 1 and 2, wherein the configuration indicates that an error vector magnitude parameter is optimized over an adjacent channel leakage ratio parameter, and wherein assigning the weights to the error signal to generate the weighted error signal comprises: assigning a first weight to an in-channel portion of the error signal and a second weight to an out-of-channel portion of the error signal, wherein the first weight is a higher weight relative to the second weight.

Aspect 4: The method of one or more of Aspects 1 through 3, wherein the configuration indicates that an adjacent channel leakage ratio parameter associated with a side-band is optimized, and wherein assigning the weights to the error signal to generate the weighted error signal comprises: assigning a first weight to a portion of the error signal associated with the side-band and a second weight to a remaining portion of the error signal, wherein the first weight is a higher weight relative to the second weight.

Aspect 5: The method of one or more of Aspects 1 through 4, wherein the DPD is computed based at least in part on a memoryless model, a memory polynomial, a direct learning architecture, an indirect learning architecture, an adaptive calibration process, or a static calibration process.

Aspect 6: The method of one or more of Aspects 1 through 5, wherein the configuration indicates an in-band frequency range and a weight coefficient for the portion of the frequency range, and wherein assigning the weights to the error signal to generate the weighted error signal comprises: applying the weight coefficient to the portion of the error signal associated with the portion of the frequency based at least in part on an in-band frequency associated with the wireless node corresponding to the in-band frequency indicated in the configuration.

Aspect 7: The method of one or more of Aspects 1 through 6, wherein the wireless node comprises a user equipment, a base station, a central unit, a distributed unit, or a transmit receive point.

Aspect 8: An apparatus for wireless communication at a device, comprising: a processor; memory coupled with the processor; and instructions stored in the memory and executable by the processor to cause the apparatus to perform the method of one or more of Aspects 1 through 7.

Aspect 9: A device for wireless communication, comprising a memory and one or more processors coupled to the memory, the one or more processors configured to perform the method of one or more of Aspects 1 through 7.

Aspect 10: An apparatus for wireless communication, comprising at least one means for performing the method of one or more of Aspects 1 through 7.

Aspect 11: A non-transitory computer-readable medium storing code for wireless communication, the code comprising instructions executable by a processor to perform the method of one or more of Aspects 1 through 7.

Aspect 12: A non-transitory computer-readable medium storing a set of instructions for wireless communication, the set of instructions comprising one or more instructions that, when executed by one or more processors of a device, cause the device to perform the method of one or more of Aspects 1 through 7.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless node, comprising:
   receiving a configuration indicating one or more parameters of a signal to be optimized for a portion of a frequency range over which the signal is transmitted;
   transforming a feedback signal and a reference signal from a time domain into a frequency domain;
   generating an error signal based at least in part on the feedback signal and the reference signal being transformed into the frequency domain;
   assigning weights to the error signal to generate a weighted error signal, wherein the weights are assigned to the error signal in the portion of the frequency range and a remaining portion of the frequency range according to the configuration; and
   transmitting the signal based at least in part on applying digital pre-distortion (DPD) to the signal, wherein the DPD is computed based at least in part on the weighted error signal.

2. The method of claim 1, wherein the configuration indicates that an adjacent channel leakage ratio parameter is optimized over an error vector magnitude parameter, and wherein assigning the weights to the error signal to generate the weighted error signal comprises:
   assigning a first weight to an out-of-channel portion of the error signal and a second weight to an in-channel portion of the error signal, wherein the first weight is a higher weight relative to the second weight.

3. The method of claim 1, wherein the configuration indicates that an error vector magnitude parameter is optimized over an adjacent channel leakage ratio parameter, and wherein assigning the weights to the error signal to generate the weighted error signal comprises:
   assigning a first weight to an in-channel portion of the error signal and a second weight to an out-of-channel portion of the error signal, wherein the first weight is a higher weight relative to the second weight.

4. The method of claim 1, wherein the configuration indicates that an adjacent channel leakage ratio parameter associated with a side-band is optimized, and wherein assigning the weights to the error signal to generate the weighted error signal comprises:
   assigning a first weight to a portion of the error signal associated with the side-band and a second weight to a remaining portion of the error signal, wherein the first weight is a higher weight relative to the second weight.

5. The method of claim 1, wherein the DPD is computed based at least in part on a memoryless model, a memory polynomial, a direct learning architecture, an indirect learning architecture, an adaptive calibration process, or a static calibration process.

6. The method of claim 1, wherein the configuration indicates an in-band frequency range and a weight coefficient for the portion of the frequency range, and wherein assigning the weights to the error signal to generate the weighted error signal comprises:
   applying the weight coefficient to the portion of the error signal associated with the portion of the frequency range based at least in part on an in-band frequency associated with the wireless node corresponding to the in-band frequency indicated in the configuration.

7. The method of claim 1, wherein the wireless node comprises a user equipment, a base station, a central unit, a distributed unit, or a transmit receive point.

8. A wireless node for wireless communication, comprising:
   a memory; and
   one or more processors, coupled to the memory, configured to:
      receive a configuration indicating one or more parameters of a signal to be optimized for a portion of a frequency range over which the signal is transmitted;
      transform a feedback signal and a reference signal from a time domain into a frequency domain;
      generate an error signal based at least in part on the feedback signal and the reference signal being transformed into the frequency domain;
      assign weights to the error signal to generate a weighted error signal, wherein the weights are assigned to the error signal in the portion of the frequency range and a remaining portion of the frequency range according to the configuration; and
      transmit the signal based at least in part on applying digital pre-distortion (DPD) to the signal, wherein the DPD is computed based at least in part on the weighted error signal.

9. The wireless node of claim 8, wherein the configuration indicates that an adjacent channel leakage ratio parameter is optimized over an error vector magnitude parameter, and wherein the one or more processors, to assign the weights to the error signal to generate the weighted error signal, are configured to:
    assign a first weight to an out-of-channel portion of the error signal and a second weight to an in-channel portion of the error signal, wherein the first weight is a higher weight relative to the second weight.

10. The wireless node of claim 8, wherein the configuration indicates that an error vector magnitude parameter is optimized over an adjacent channel leakage ratio parameter, and wherein the one or more processors, to assign the weights to the error signal to generate the weighted error signal, are configured to:
    assign a first weight to an in-channel portion of the error signal and a second weight to an out-of-channel portion of the error signal, wherein the first weight is a higher weight relative to the second weight.

11. The wireless node of claim 8, wherein the configuration indicates that an adjacent channel leakage ratio parameter associated with a side-band is optimized, and wherein the one or more processors, to assign the weights to the error signal to generate the weighted error signal, are configured to:
    assign a first weight to a portion of the error signal associated with the side-band and a second weight to a remaining portion of the error signal, wherein the first weight is a higher weight relative to the second weight.

12. The wireless node of claim 8, wherein the DPD is computed based at least in part on a memoryless model, a memory polynomial, a direct learning architecture, an indirect learning architecture, an adaptive calibration process, or a static calibration process.

13. The wireless node of claim 8, wherein the configuration indicates an in-band frequency range and a weight coefficient for the portion of the frequency range, wherein the one or more processors, to assign the weights to the error signal to generate the weighted error signal, are configured to:
    apply the weight coefficient to the portion of the error signal associated with the portion of the frequency range based at least in part on an in-band frequency associated with the wireless node corresponding to the in-band frequency indicated in the configuration.

14. The wireless node of claim 8, wherein the wireless node comprises a user equipment, a base station, a central unit, a distributed unit, or a transmit receive point.

15. A non-transitory computer-readable medium storing a set of instructions for wireless communication, the set of instructions comprising:
    one or more instructions that, when executed by one or more processors of a wireless node, cause the wireless node to:
        receive a configuration indicating one or more parameters of a signal to be optimized for a portion of a frequency range over which the signal is transmitted;
        transform a feedback signal and a reference signal from a time domain into a frequency domain;
        generate an error signal based at least in part on the feedback signal and the reference signal being transformed into the frequency domain;
        assign weights to the error signal to generate a weighted error signal, wherein the weights are assigned to the error signal in the portion of the frequency range and a remaining portion of the frequency range according to the configuration; and
        transmit the signal based at least in part on applying digital pre-distortion (DPD) to the signal, wherein the DPD is computed based at least in part on the weighted error signal.

16. The non-transitory computer-readable medium of claim 15, wherein the configuration indicates that an adjacent channel leakage ratio parameter is optimized over an error vector magnitude parameter, and wherein the one or more instructions, that cause the wireless node to assign the weights to the error signal to generate the weighted error signal, cause the wireless node to:
    assign a first weight to an out-of-channel portion of the error signal and a second weight to an in-channel portion of the error signal, wherein the first weight is a higher weight relative to the second weight.

17. The non-transitory computer-readable medium of claim 15, wherein the configuration indicates that an error vector magnitude parameter is optimized over an adjacent channel leakage ratio parameter, and wherein the one or more instructions, that cause the wireless node to assign the weights to the error signal to generate the weighted error signal, cause the wireless node to:
    assign a first weight to an in-channel portion of the error signal and a second weight to an out-of-channel portion of the error signal, wherein the first weight is a higher weight relative to the second weight.

18. The non-transitory computer-readable medium of claim 15, wherein the configuration indicates that an adjacent channel leakage ratio parameter associated with a side-band is optimized, and wherein the one or more instructions, that cause the wireless node to assign the weights to the error signal to generate the weighted error signal, cause the wireless node to:
    assign a first weight to a portion of the error signal associated with the side-band and a second weight to a remaining portion of the error signal, wherein the first weight is a higher weight relative to the second weight.

19. The non-transitory computer-readable medium of claim 15, wherein the DPD is computed based at least in part on a memoryless model, a memory polynomial, a direct learning architecture, an indirect learning architecture, an adaptive calibration process, or a static calibration process.

20. The non-transitory computer-readable medium of claim 15, wherein the configuration indicates a weight coefficient associated with the portion of the frequency range and an in-band frequency range, and wherein the one or more instructions, that cause the wireless node to assign the weights to the error signal to generate the weighted error signal, cause the wireless node to:
    apply the weight coefficient to the portion of the error signal associated with the portion of the frequency range based at least in part on an in-band frequency associated with the wireless node corresponding to the in-band frequency indicated in the configuration.

21. The non-transitory computer-readable medium of claim 15, wherein the wireless node comprises a user equipment, a base station, a central unit, a distributed unit, or a transmit receive point.

22. An apparatus for wireless communication, comprising:
    means for receiving a configuration indicating one or more parameters of a signal to be optimized for a portion of a frequency range over which the signal is transmitted;

means for transforming a feedback signal and a reference signal from a time domain into a frequency domain;

means for generating an error signal based at least in part on the feedback signal and the reference signal being transformed into the frequency domain;

means for assigning weights to the error signal to generate a weighted error signal, wherein the weights are assigned to the error signal in the portion of the frequency range and a remaining portion of the frequency range according to the configuration; and means for transmitting the signal based at least in part on applying digital pre-distortion to the signal, wherein the digital pre-distortion is computed based at least in part on the weighted error signal.

23. The apparatus of claim 22, wherein the configuration indicates that an adjacent channel leakage ratio parameter is optimized over an error vector magnitude parameter, and wherein the means for assigning the weights to the error signal to generate the weighted error signal comprises:

means for assigning a first weight to an out-of-channel portion of the error signal and a second weight to an in-channel portion of the error signal, wherein the first weight is a higher weight relative to the second weight.

24. The apparatus of claim 22, wherein the configuration indicates that an error vector magnitude parameter is optimized over an adjacent channel leakage ratio parameter, and wherein the means for assigning the weights to the error signal to generate the weighted error signal comprises:

means for assigning a first weight to an in-channel portion of the error signal and a second weight to an out-of-channel portion of the error signal, wherein the first weight is a higher weight relative to the second weight.

25. The apparatus of claim 22, wherein the configuration indicates that an adjacent channel leakage ratio parameter associated with a side-band is optimized, and wherein the means for assigning the weights to the error signal to generate the weighted error signal comprises:

means for assigning a first weight to a portion of the error signal associated with the side-band and a second weight to a remaining portion of the error signal, wherein the first weight is a higher weight relative to the second weight.

26. The apparatus of claim 22, wherein the digital pre-distortion is computed based at least in part on a memoryless model, a memory polynomial, a direct learning architecture, an indirect learning architecture, an adaptive calibration process, or a static calibration process.

27. The apparatus of claim 22, wherein the configuration indicates a weight coefficient associated with the portion of the frequency range and an in-band frequency range, and wherein the means for assigning the weights to the error signal to generate the weighted error signal comprises:

means for applying the weight coefficient to the portion of the error signal associated with the portion of the frequency range based at least in part on an in-band frequency associated with the apparatus corresponding to the in-band frequency indicated in the configuration.

28. The apparatus of claim 22, wherein the apparatus comprises a user equipment, a base station, a central unit, a distributed unit, or a transmit receive point.

\* \* \* \* \*